United States Patent
Kwon et al.

(10) Patent No.: US 9,757,674 B2
(45) Date of Patent: Sep. 12, 2017

(54) AIR CLEANING DEVICE

(71) Applicant: Samsung Electronics Co., Ltd., Suwon-si (KR)

(72) Inventors: Sung-wook Kwon, Hwaseong-si (KR); Ki-jun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 63 days.

(21) Appl. No.: 14/736,829

(22) Filed: Jun. 11, 2015

(65) Prior Publication Data

US 2016/0038868 A1 Feb. 11, 2016

(30) Foreign Application Priority Data

Aug. 5, 2014 (KR) .................. 10-2014-0100674

(51) Int. Cl.
| | | |
|---|---|---|
| *B01D 46/00* | (2006.01) | |
| *G01M 3/00* | (2006.01) | |
| *G01M 3/38* | (2006.01) | |
| *G01N 15/06* | (2006.01) | |
| *G01N 21/89* | (2006.01) | |
| *F24F 3/16* | (2006.01) | |
| *F24F 11/00* | (2006.01) | |

(52) U.S. Cl.
CPC ..... *B01D 46/0086* (2013.01); *B01D 46/0002* (2013.01); *F24F 3/1603* (2013.01); *B01D 2273/26* (2013.01); *F24F 2011/0093* (2013.01)

(58) Field of Classification Search
CPC .......... B01D 46/00; G01M 3/00; G01M 3/38; G01N 15/06; G01N 21/89
USPC .... 55/341.1, 471, 472, 473, 385.1, DIG. 34; 95/25; 96/417; 340/605; 356/438
See application file for complete search history.

(56) References Cited

U.S. PATENT DOCUMENTS

| | | | |
|---|---|---|---|
| 4,779,456 A | 10/1988 | Cantoni | |
| 5,572,327 A * | 11/1996 | Plinke | G01M 3/38 340/605 |
| 7,012,685 B1 | 3/2006 | Wilson | |
| 7,416,574 B2 * | 8/2008 | Udagawa | B01D 46/0001 219/400 |
| 2010/0077926 A1 * | 4/2010 | Yamagishi | B03C 3/017 96/423 |
| 2010/0165186 A1 * | 7/2010 | Kawai | B06B 1/02 348/375 |
| 2013/0291786 A1 * | 11/2013 | Jeong | G09F 3/0291 116/201 |

FOREIGN PATENT DOCUMENTS

| | | |
|---|---|---|
| DE | 3722693 | 5/1988 |
| DE | 10245911 | 4/2004 |
| EP | 0241438 | 10/1987 |

OTHER PUBLICATIONS

Extended European Search Report dated Jan. 5, 2016 in European Patent Application No. 15179118.3.

* cited by examiner

*Primary Examiner* — Jacob T Minskey
*Assistant Examiner* — Minh-Chau Pham
(74) *Attorney, Agent, or Firm* — Staas & Halsey LLP

(57) ABSTRACT

An air cleaning device is provided. The air cleaning device includes: a main body; a filter configured to be disposed in the main body to purify air; and an image transmitter configured to show a state of the filter to an outside of the main body.

14 Claims, 15 Drawing Sheets

AIR CLEANING DEVICE

CROSS-REFERENCE TO RELATED APPLICATIONS

This application claims the priority benefit under 35 U.S.C. §119 from Korean Patent Application No. 10-2014-0100674, filed on Aug. 5, 2014, in the Korean Intellectual Property Office, the disclosure of which is incorporated herein by reference in its entirety.

BACKGROUND

1. Field

Embodiments generally relates to providing an air cleaning device, and more particularly, to providing an air cleaning device that enables a contamination of a filter installed inside to be directly checked from an outside.

2. Description of the Related Art

Air cleaning devices have popularized with serious air contaminations in big cities. Such an air cleaning device has been sold as an air cleaner having only an air cleaning function, i.e., an air conditioner having an air cleaning function has been sold.

The air cleaning device includes a filter for purifying contaminants in the air. The filter is contaminated in a process of purifying air and thus needs to be replaced. However, the filter that is installed inside the air cleaning device is taken out of the air cleaning device to directly check a contamination level with eyes. Therefore, a process of checking the filter is complicated, and a user touches the filter when taking the filter out of the air cleaning device. As a result, hands of the user may be contaminated. Also, if the filter is separated from the air cleaning device, contaminants existing in the filter may be re-scattered around, and thus air may be contaminated.

Therefore, various types of sensors are applied to the air cleaning device to check a replacement time of the filter. In detail, there are used a sensor that senses chemicals included in air, a sensor that senses that the filter is clogged with contaminants, and thus an air volume is deteriorated, and a sensor that demands a replacement of the filter when an operating time of the air cleaning devices reaches a reference value. However, the air cleaning device that checks the contamination level of the filter by using various types of sensors as described above has no choice to indirectly check the filter. Therefore, the contamination level of the filter may not be accurately checked.

SUMMARY

One or more exemplary embodiments address at least the above problems and/or disadvantages and other disadvantages not described above. Also, the exemplary embodiments are not required to overcome the disadvantages described above, and an exemplary embodiment may not overcome any of the problems described above.

Exemplary embodiments provide an air cleaning device that enables a contamination of a filter to be accurately checked from outside without taking the filter out of the air cleaning device.

According to an aspect of one or more exemplary embodiments, there is provided an air cleaning device including: a main body; a filter configured to be disposed in the main body to purify air; and an image transmitter configured to show a state of the filter to an outside of the main body.

The image transmitter may be a main mirror.

The main mirror may be disposed to incline toward a side of the filter so as to reflect a part of the filter. The main body may include a check hole that is formed in a position into which an image reflected from the main mirror is projected.

A transparent member may be installed in the check hole.

The main body may further include an external mirror configured to be disposed to incline toward the check hole.

The main body comprises a door that opens and closes the check hole, and the external mirror may be attached onto the door.

The main body may include an internal blocking plate configured to block parts except the check hole that is exposed when the door is opened.

The check hole may be formed on one selected from a side surface, a front surface, and an upper surface.

The air cleaning device may further include an internal mirror configured to incline toward the main mirror or to be disposed parallel with the main mirror so as to re-reflect the image reflected from the main mirror. The main mirror may incline toward a side of the filter to reflect a part of the filter, and the main body may include a check hole that is formed in a position into which the image reflected from the internal mirror is projected.

A transparent member may be installed in the check hole.

The check hole may be formed on a front surface of the main body.

The main mirror may be rotatably installed to change the reflected part of the filter. The rotation of the main mirror may be manually controlled by a handle or automatically controlled by an electric motor in order to rotate the main mirror to enable a user to view different areas of the filter.

The air cleaning device may further include an illumination lamp configured to be disposed in the main body to illuminate the part of the filter reflected from the main mirror.

The main body may include a lighting hole that is formed in a position of the main body from which light outside of the main body is irradiated onto the part of the filter reflected from the main mirror.

The image transmitter may be a camera module. The air cleaning device may further include a display unit configured to display an image of the filter transmitted by the camera module.

The display unit may be a display panel that is formed on one selected from a side surface, a front surface, and an upper surface of the main body. The air cleaning device may further include a controller configured to receive the image of the filter from the camera module and configured to control of display the image on the display panel.

According to an aspect of one or more exemplary embodiments, there is provided an air cleaning device including: a main body; a filter configured to be disposed in the main body to purify air; a check hole configured to penetrate the main body so as to show an internal part of the main body; a main mirror configured to reflect a part of the filter; and an external mirror configured to be disposed outside the main body to re-reflect an image of the part of the filter reflected from the main mirror or an internal mirror configured to be disposed inside the main body to re-reflect the image of the part of the filter reflected from the main mirror.

The main mirror may rotate to adjust an angle. The rotation of the main mirror may be manually controlled by a handle or automatically controlled by an electric motor in order to rotate the main mirror to enable a user to view different areas of the filter.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1A:
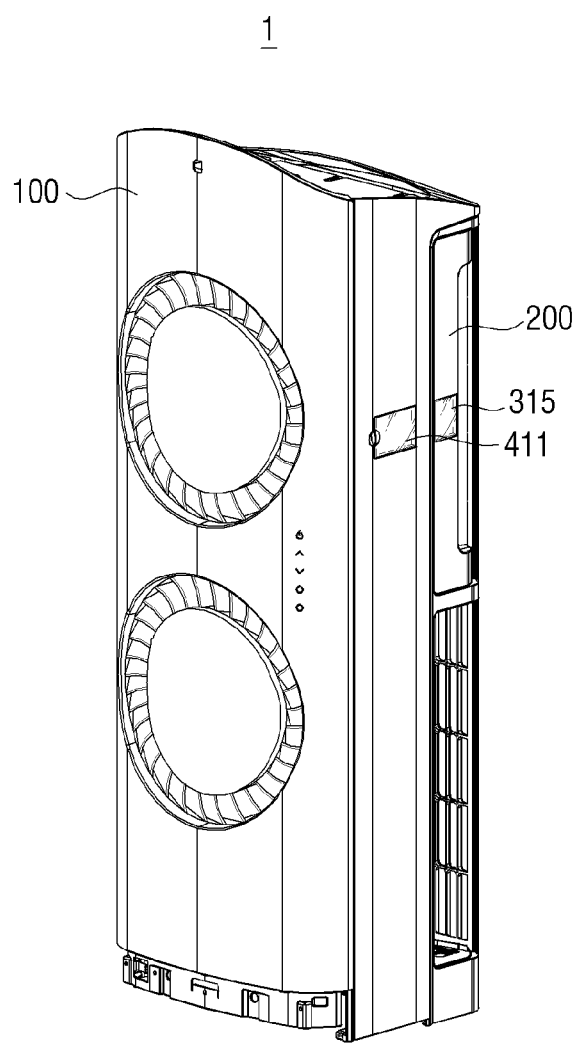
FIG. 1A is a perspective view illustrating an air cleaning device according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 1B:
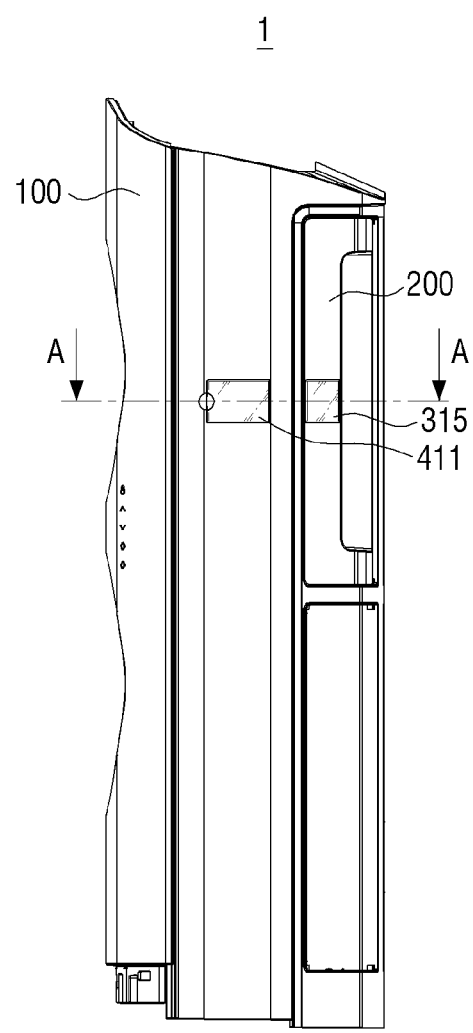
FIG. 1B is a right side view of the air cleaning device of FIG. 1A.
Figure 1C:
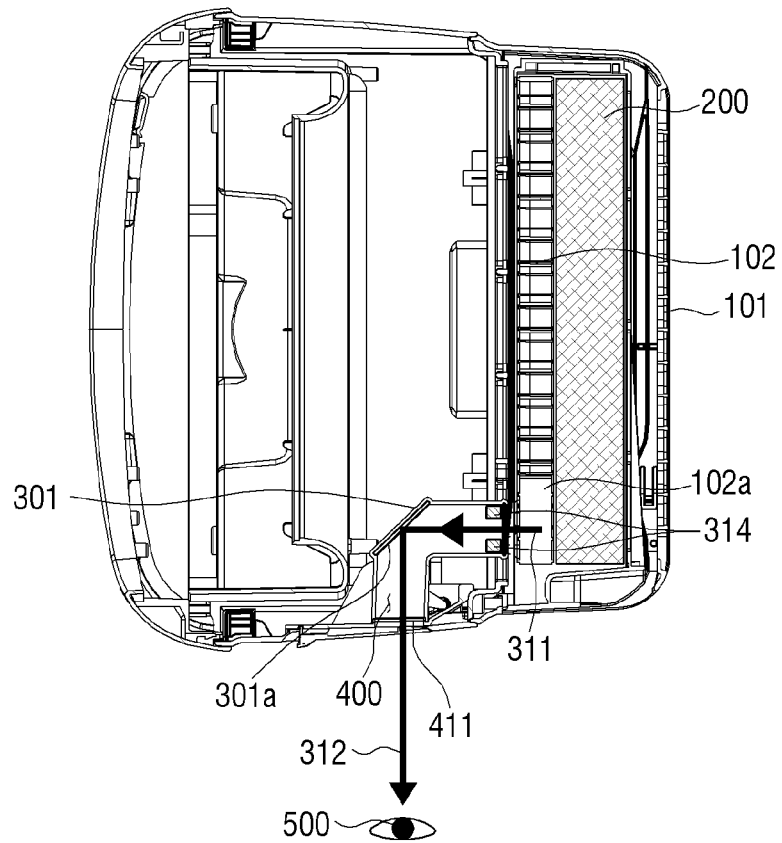
FIGS. 1C and 1D are cross-sectional views taken along line A-A of FIG. 1B.

Referring to FIGS. 1A through 1C, an air cleaning device 1 according to an exemplary embodiment includes a main body 100, a filter 200, a main mirror 301, and a check hole 400.

The main body 100 forms an external appearance of the air cleaning device 1 and includes a filter installing part which is formed in a side thereof and into which the filter 200 is inserted. The filter installing part is set between an external grill 101 and an internal grill 102 as shown in FIG. 10. In this case, external air may flow into the main body 100 through the side of the main body 100 and then pass the filter 200 through the internal grill 102 so as to remove contaminants therefrom. As a result, purified air may be discharged toward an upper part of the main body 100.

The internal grill 102 includes a plurality of through holes which operate as passages through which the external air flowing into the main body 100 flows toward the filter 200. The internal grill 102 also fixes the filter 200 that is installed inside the air cleaning device 1 and includes a through hole 102a that is formed to enable a part of the filter 200 to be reflected from the main mirror 301.

The filter 200 samples contaminants from air to pass only purified air. Therefore, as the filter 200 is used, the filter 200 is contaminated and thus may be replaced. The filter 200 is disposed in a rear part inside the main body 100 in an exemplary embodiment but is not limited thereto. Therefore, the filter 200 may be disposed in a center or in a front inside the main body 100.

The main mirror 301 is an image transmitter that transmits an image of a part of the filter 200 to an outside of the main body 100 so as to enable a contamination level of the part of the filter 200, which is exposed through the through hole 102a of the internal grill 102, to be checked with eyes from the outside of the main body 100.

The main mirror 301 is also disposed to incline toward a side of the filter 200 at a preset angle so as to reflect the part of the filter 200. Here, the main mirror 301 may be disposed to enable an angle between a first optical axis 311 and a second optical axis 312 to be approximately a right angle. Here, the first optical axis 311 is formed between the filter 200 and the main mirror 310, and the second optical axis 312 is formed between the main mirror 301 and the check hole 400.

The main mirror 301 may be disposed at a preset angle to enable a reflective surface 301a to reflect the part of the filter 200 so as to transmit the image of the part of the filter 200 to the check hole 400.

Figure 1D:
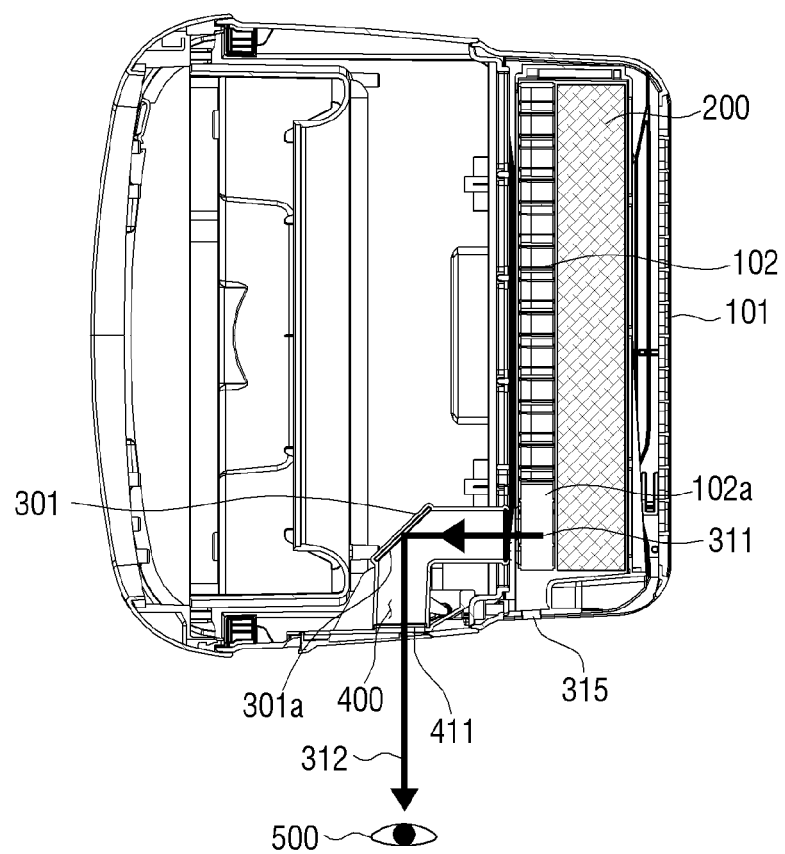

The check hole 400 may be positioned on the side of the main body 100 as shown in FIGS. 1B-1D, i.e., may be formed to penetrate a part of the side of the main body 100 onto which the image reflected from the main mirror 301 is projected. The check hole 400 may be formed in various shapes such as a circular shape, an elliptical shape, a polygonal shape, etc.

A transparent member 411 may be installed in the check hole 400 so as to interrupt the main body 100 from being connected to the outside and check an image of the filter 200 that is reflected. The transparent member 411 may be formed of various types of materials such as glass, transparent acryl, etc.

Referring to FIG. 1C, since an inside of the air cleaning device 1 is dark, an illumination lamp 314 is disposed around the filter 200 to illuminate the filter 200 so as to well show the image of the part of the filter 200 that is reflected from the main mirror 301. In this case, an illumination switch (not shown) may be disposed in the main body 100 to turn and/or off the illumination lamp 314. The illumination lamp 314 may be a light-emitting diode (LED) that consumes a small amount of power.

The air cleaning device 1 having the above-described structure according to an exemplary embodiment enables the user to accurately check a contamination level of the filter 200 through the transparent member 411 with eyes without taking the filter 200 out of the main body 100.

In other words, referring to FIG. 10, the check hole 400 in which the transparent member 411 is installed is formed in a side of the main body 100. Therefore, an eye 500 of the user looks at the transparent member 411 on a side of the air cleaning device 1.

Here, since the illumination lamp 314 illuminates the filter 200, the image of the part of the filter 200 reflected from the reflective surface 301a of the main mirror 301 is transmitted to the transparent member 411. Therefore, the user may check the contamination level of the filter 200 from the outside of the main body 100.

The illumination lamp 314 is disposed around the filter 200 according to an exemplary embodiment described above but is not limited thereto. Therefore, as shown in FIG. 1D, a lighting hole 315 may be formed in a preset position of the main body 100 to irradiate external light onto the part of the filter 200 so as to use natural lighting. In this case, the illumination lamp 314 may be omitted or the illumination lamp 314 and the lighting hole 315 may be provided together so as to use natural lighting and artificial light together.

The lighting hole 315 may be combined with a glass or transparent plastic member to prevent contaminants from flowing into the main body 100 through the lighting hole 315.

Figure 2A:
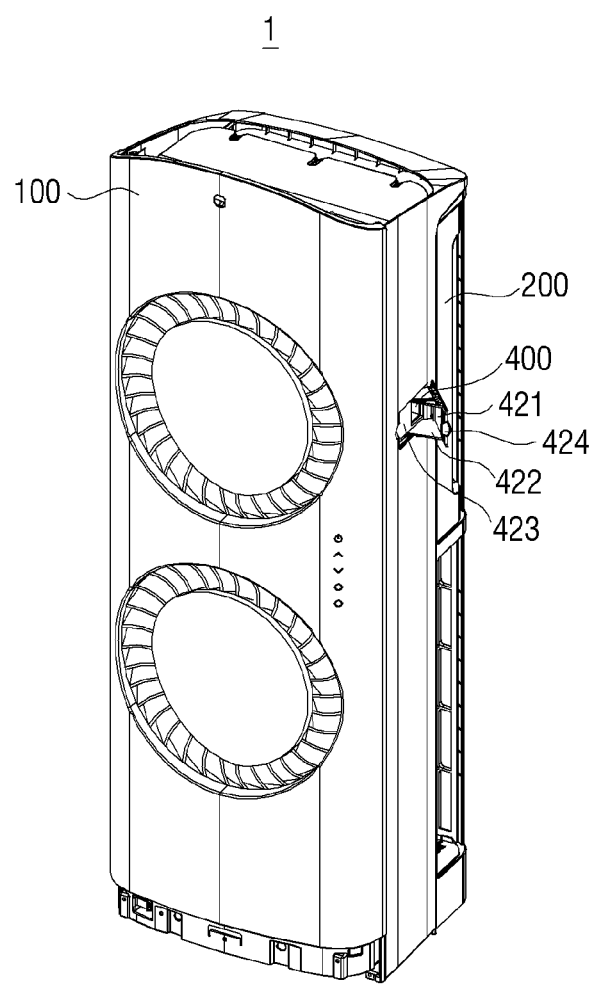
FIG. 2A is a perspective view illustrating an air cleaning device according to an exemplary embodiment.
Figure 2B:
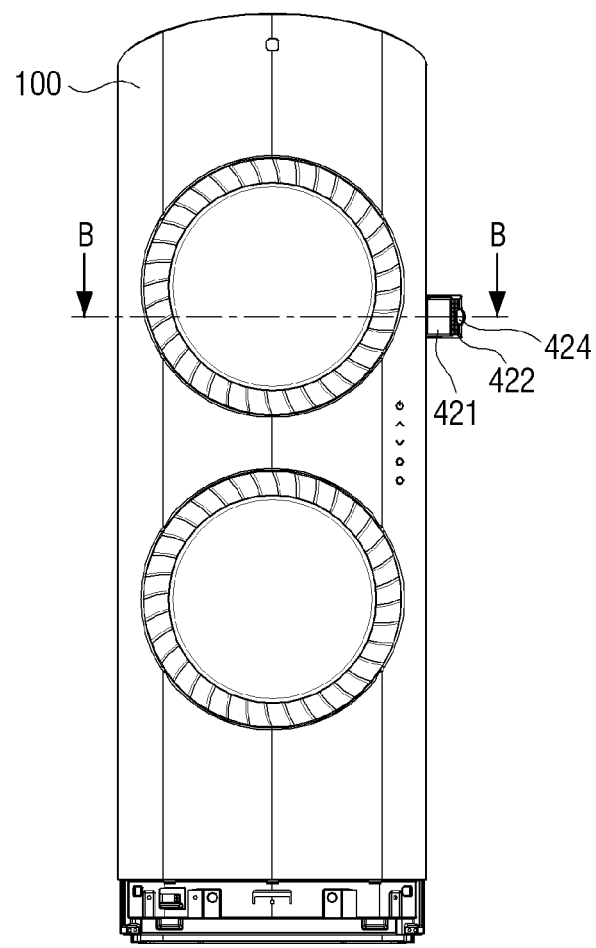
FIG. 2B is a front view of the air cleaning device of FIG. 2A.

An air cleaning device 1 according to an exemplary embodiment will be described with reference to FIGS. 2A through 2C.

A main body 100, a filter 200, a main mirror 301, and a check hole 400 are the same as the main body 100, the filter 200, the main mirror 301, and the check hole 400 of the a previous exemplary embodiment shown in FIGS. 1A through 1D, and thus their descriptions are omitted. Therefore, only elements of an exemplary embodiment different from the elements of a previous exemplary embodiment shown in FIGS. 1A through 1D will be described.

The air cleaning device 1 according to an exemplary embodiment further includes an external mirror 421 that is disposed on an outer surface of the main body 100 in which the check hole 400 is formed.

The external mirror 421 re-reflects an image of the filter 200 reflected from a reflective surface 301*a* of the main mirror 301 to enable the eye 500 of the user to check a state (a contamination level) of the filter 200 at the front.

Figure 2C:
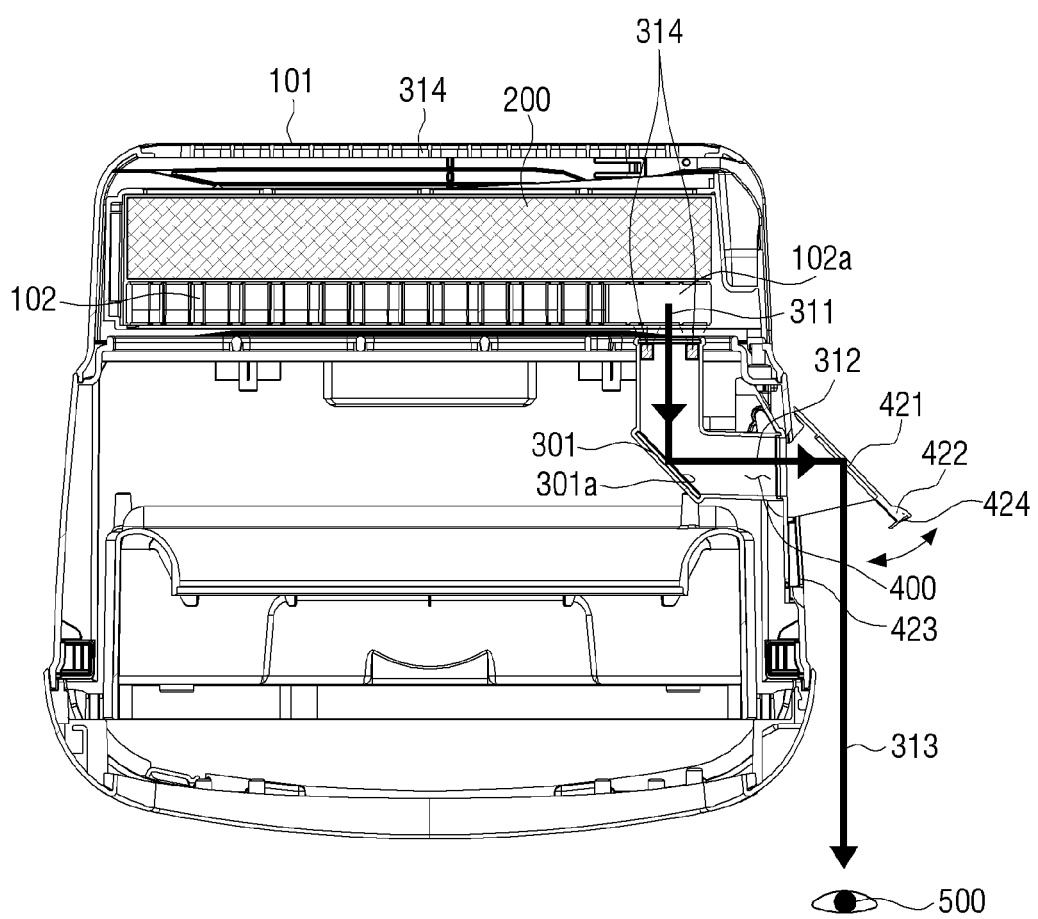
FIG. 2C is a cross-sectional view taken along line B-B of FIG. 2B.

In other words, as shown in FIG. 2C, an image of a part of the filter 200 is reflected from the external mirror 421 along first and second optical axes 311 and 312 and then comes into the eye 500 of the user along a third optical axis 313 formed between the external mirror 421 and the eye 500 of the user.

In this case, the main body 100 may include the external mirror 421 that is attached onto the main body 100 and a door 422 that opens and closes the check hole 400.

If the door 422 closes the check hole 400, the door 422 forms an external appearance of the main body 100. Since the door 422 is disposed to incline toward a side of the main body 100 at a preset angle, the user may check a contamination level of the part of the filter 200 through the external mirror 421 at the front of the main body 100 if the door 422 opens the check hole 400.

The door 422 may freely adjust a set angle in consideration of a position of the user.

The door 422 may also further include a handle 424, which is formed on an outer side of the door 422, so as to easily open and close the check hole 400.

Also, the door 422 may be larger than the check hole 400 to transmit the image of the part of the filter 200, which is transmitted from the main mirror 301, to the eye 500 of the user. Therefore, if the door 422 is opened, other parts except the check hole 400 may be exposed to an outside of the main body 100.

In this case, contaminants or the like may flow from the outside into the main body 100, and thus the air cleaning device 1 may incorrectly operate, and this does not provide a fine view. Therefore, an internal blocking plate 423 may be further provided to block other parts except the check hole 400. The internal blocking plate 423 may extend from the main body 100 or may be formed of the same material as the main body 100.

As in a previous exemplary embodiment described above, in an exemplary embodiment, an illumination lamp 314 or a lighting hole 315 may be provided in the main body 100 to illuminate the filter 200 or both of the illumination lamp 314 and the lighting hole 315 may be provided in the main body 100 to illuminate the filter 200.

An air cleaning device according to an exemplary embodiment will now be described with reference to FIGS. 3A and 3B.

Structures of a main body 100, a filter 200, and an illumination lamp 314 are the same as in a previously described exemplary embodiment described with to FIGS. 1A through 1D, and thus their descriptions are omitted.

Figure 3A:
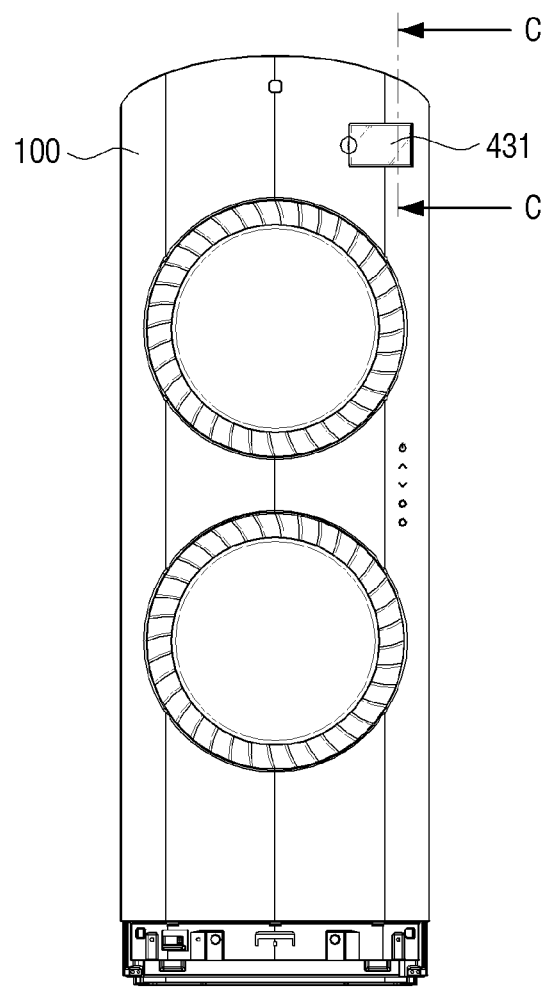
FIG. 3A is a front view illustrating an air cleaning device according to an exemplary embodiment.

As shown in FIG. 3A, in the air cleaning device according to an exemplary embodiment, a check hole 400 is positioned at a front of the main body 100. Therefore, differently from a previous exemplary embodiment described with reference to FIGS. 2A through 2C, in an exemplary embodiment shown in FIGS. 3A and 3B, although the door 422 is not provided, the eye 500 of the user may simply check a contamination level of the filter 200 in front of the air cleaning device. For this, a main mirror 301 may be disposed to reflect an image of a part of the filter 200 toward an upper surface of the main body 100.

Figure 3B:
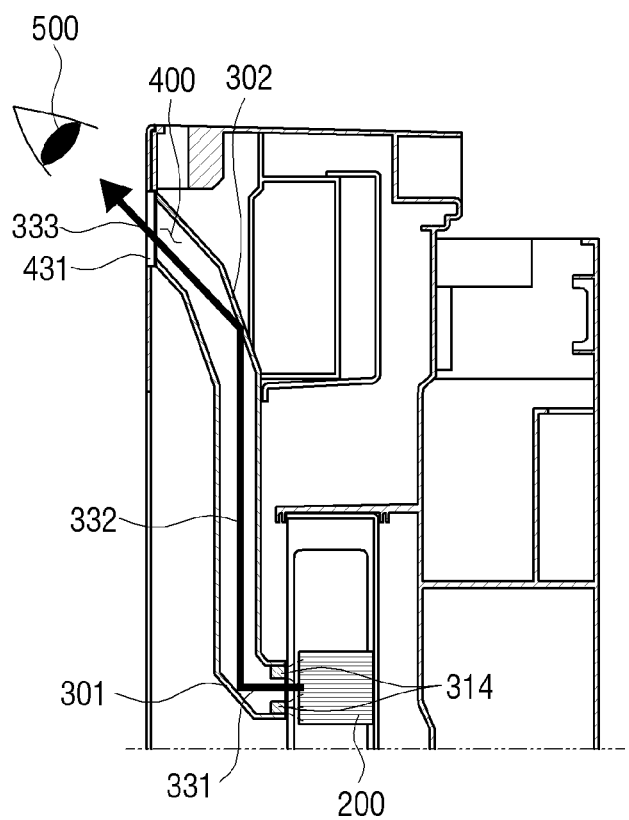
FIG. 3B is a schematic cross-sectional view taken along line C-C of FIG. 3A.

Differently from previous exemplary embodiments, in an exemplary embodiment shown in FIGS. 3A and 3B, an internal mirror 302 may be further disposed to incline on a second optical axis 332 through which the image reflected form the main mirror 301 passes.

Therefore, the image of the filter 200 is reflected from the main mirror 301 along a first optical axis 331 formed between the filter 200 and the main mirror 301, re-reflected from the internal mirror 302 along the second optical axis 332 formed between the main mirror 301 and the internal mirror 302, and projected into the eye 500 of the user through a third optical axis 333.

Also, as in a previous exemplary embodiment described with reference to FIGS. 1A through 1D, a transparent member 431 may be provided. Also, the lighting hole 315 may be provided to illuminate the filter 200 or an illumination lamp 314 and the lighting hole 315 may be provided together.

Figure 4:
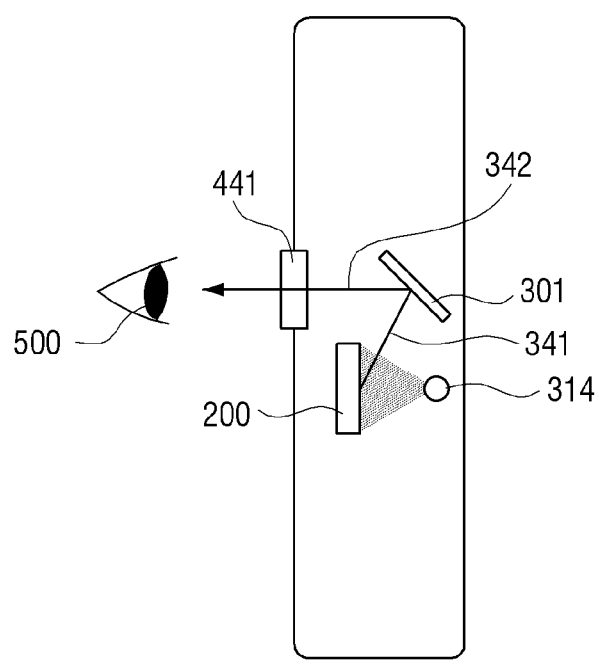
FIG. 4 is a schematic view illustrating an air cleaning device according to an exemplary embodiment.

An air cleaning device according to an exemplary embodiment will now be described with reference to FIG. 4.

A structure of the main body 100 is the same as that of the main body 100 of a previously exemplary embodiment described with reference to FIGS. 1A through 1D, and thus descriptions thereof are omitted.

In the air cleaning device according to an exemplary embodiment, a position of a main mirror 301 is disposed differently from the main mirror 301 of previously exemplary embodiments described with reference to FIGS. 1A through 3B. In detail, the filter 200 is disposed approximately in a center or at a front of the air cleaning device, and thus the main mirror 301 is disposed in a rear of the filter 200.

Therefore, the main mirror 301 reflects an image of a back surface of the filter 200 toward a front of the main body 100. In other words, the image of the filter 200 is reflected from the main mirror 301 along a first optical axis 341 and then comes into the eye 500 of the user through a transparent member 441 along a second optical axis 342.

In an exemplary embodiment, the external mirror 421 and the door 422 may be provided instead of the transparent member 441 or the illumination lamp 314 may be provided instead of the transparent member 441 to illuminate the back surface of the filter 200 as in a previous exemplary embodiment described with reference to FIGS. 1A through 1D. In this case, the lighting hole 315 may be provided instead of the illumination lamp 314 or the illumination lamp 314 and the lighting hole 315 may be simultaneously provided.

Figure 5:
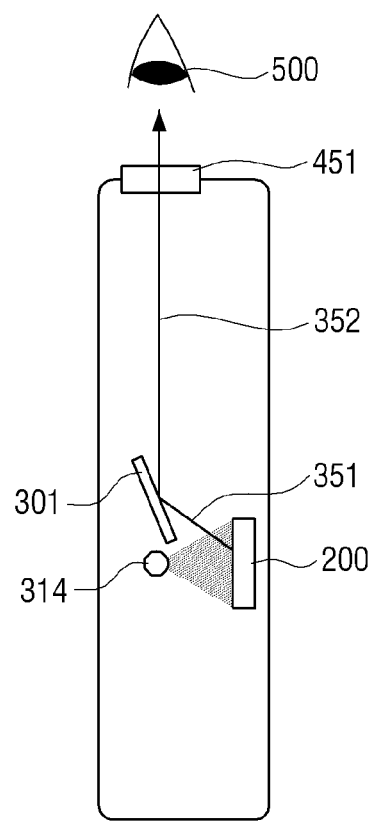
FIG. 5 is a schematic view illustrating an air cleaning device according to an exemplary embodiment.

An air cleaning device according to an exemplary embodiment will be described with reference to FIG. 5.

Structures of the main body 100 and the filter 200 are the same as those of the main body 100 and the filter 200 of a previous exemplary embodiment described with reference to FIGS. 1A through 1D, and thus their descriptions are omitted.

The air cleaning device according to an exemplary embodiment enables the user to check a state of the filter 200 at a top of the air cleaning device.

In detail, the main mirror 310 is disposed differently from a previous exemplary embodiment described with reference to FIGS. 1A through 1D. Therefore, an image of a part of the filter 200 is reflected from the main mirror 301 along a first optical axis 351 and then projected onto the top of the air cleaning device along a second optical axis 352. Therefore, the user may directly check a state of the filter 200 with the eye 500 through a transparent member 451 that is disposed at the top of the air cleaning device.

As in a previous exemplary embodiment described with reference to FIGS. 1A through 1D, in an exemplary embodiment, the illumination lamp 314 is provided to illuminate the filter 200. However, the lighting hole 315 may be provided instead of the illumination lamp 314 or the illumination lamp 314 and the lighting hole 315 may be provided together.

An air cleaning device according to an exemplary embodiment will be described with reference to FIGS. 6A and 6B.

Structures of the main body 100 and the filter 200 are the same as those of the main body 100 and the filter 200 of a previous exemplary embodiment described with reference to FIGS. 1A through 1D, and this their descriptions are omitted.

In the air cleaning device according to an exemplary embodiment, the main mirror 301 is rotatably installed so as to change a reflected part of the filter 200.

If the main mirror 301 is set to an angle corresponding to position D, the user may directly check a part of the filter 200 corresponding to the painted position D through a transparent member 461 as in a previous exemplary embodiment described with reference to FIGS. 1A through 1D.

Figure 6A:
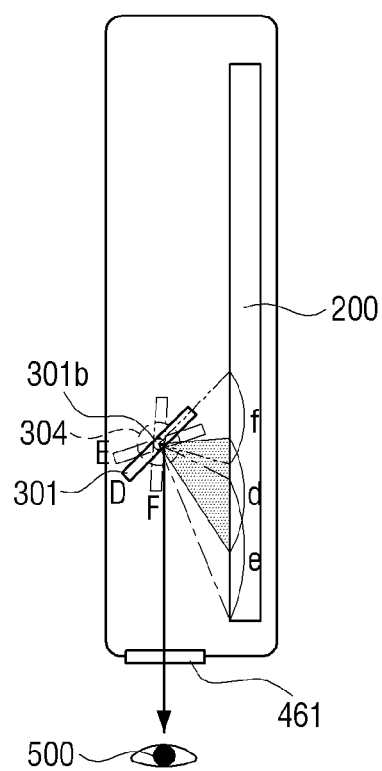
FIGS. 6A and 6B are schematic view illustrating an air cleaning device according to an exemplary embodiment.
Figure 6B:
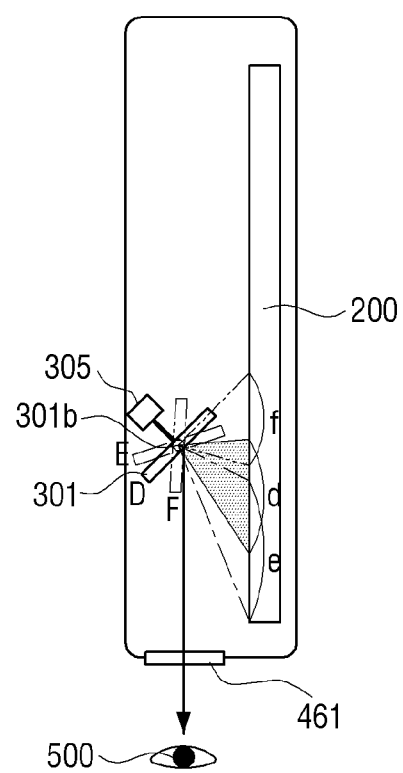

If the main mirror 301 is rotated by a rotation axis 301b to be set to an angle corresponding to another position E, the user may check a part of the filter 200 corresponding to an area e marked with alternated long and short dash lines through the transparent member 461 as shown in FIGS. 6A and 6B.

Also, if the main mirror 301 is rotated by the rotation axis 301b to be set to an angle corresponding to position F, the user may check a part of the filter 200 corresponding to an area f marked with alternated long and two short dashes lines through the transparent member 461 as shown in FIGS. 6A and 6B.

In other words, in an exemplary embodiment, as the main mirror 301 rotates, the user may check a state of a wide area of the filter 200.

As shown in FIGS. 6A and 6B, the image of the filter 200 may be checked from a side, but a disposition of the main mirror 301 may be changed so as to check a state of the filter 200 at the front or at the top of the air cleaning device as described with reference to FIG. 4 or 5.

A position of the main mirror 301 may be manually controlled by a handle (304), which extends from the main mirror 301 to protrude to the outside, or may be automatically controlled by an electric motor (305).

Also, as in a previous exemplary embodiment described with reference to FIGS. 1A through 1D, the air cleaning device may further include the illumination lamp 314 or the lighting hole 315 that illuminates the filter 200.

Figure 7A:
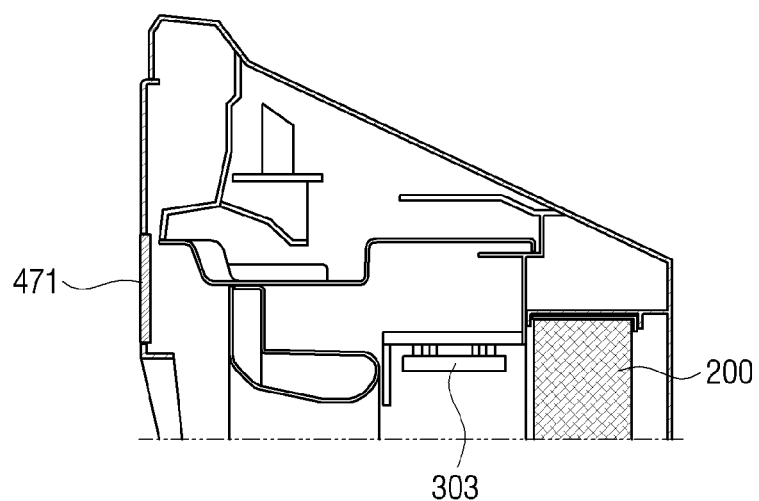
FIG. 7A is a schematic view illustrating an air cleaning device according to an exemplary embodiment.
Figure 7B:
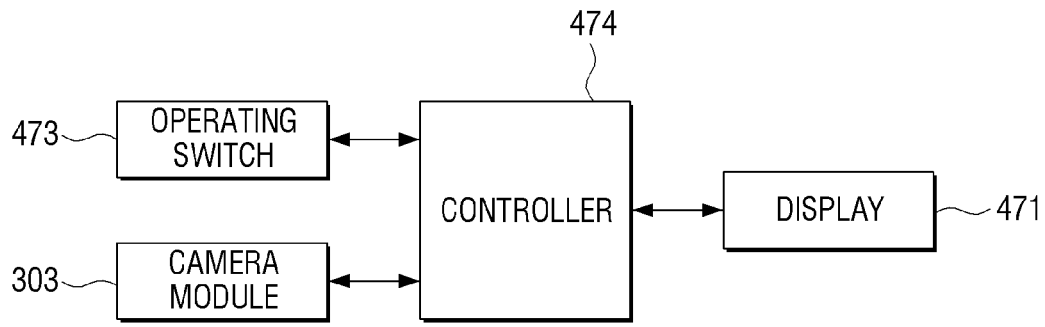
FIG. 7B is a block diagram illustrating a method of controlling an air cleaning device, according to an exemplary embodiment.

An air cleaning device according to an exemplary embodiment will be described with reference to FIGS. 7A and 7B.

The main body 100 and the filter 200 are the same as the main body 100 and the filter 200 of a previous exemplary embodiment described with reference to FIGS. 1A through 1D, and thus their descriptions are omitted.

The air cleaning device according an exemplary embodiment includes a camera module 303 as an image transmitter and a display panel 471 as a display unit.

If the camera module 303 operates through an operating switch 473, the camera module 303 captures an image of a part of the filter 200 and transmits the captured image to a controller 474. The controller 474 converts the image of the part of the filter 200, which is transmitted from the camera module 303, into an electric signal and transmits the electric signal to the display panel 471. The display panel 471 displays the image of the part of the filter 200 according to the electric signal transmitted from the controller 474 so as to enable the image of the part of the filter 200 to be checked from an outside of the main body 100.

Also, a position of the camera module 303 may be changed so as to capture a position of the filter 200, which is to be checked, through the operating switch 473.

According to the above-described exemplary embodiments, only one main mirror 301 may be used so as to reduce manufacturing cost. Therefore, the air cleaning device 1 according to the exemplary embodiments described with reference to FIGS. 1A through 1D, 4, 5, and 6 may be applied.

The filter 200 may be immediately checked at a front or top of the air cleaning device 1 without going to a side of the air cleaning device 1. Therefore, the air cleaning device 1 according to the exemplary embodiments described with reference to FIGS. 2A through 2C, 3A and 3B, 4, 5, 6, and 7A and 7B may be applied.

Also, if the filter 200 is not uniformly contaminated, and only a part of the filter 200 is contaminated, various parts of the filter 200 need to be checked. Therefore, the air cleaning device 1 according to the exemplary embodiments described with reference to FIGS. 6, and 7A and 7B may be applied.

A method of using the air cleaning device 1 having the above-described structures according to exemplary embodiments will now be described.

If the air cleaning device 1 operates, contaminated air flows into the main body 100 and then is filtered and discharged through the filter 200. In this process, the filter 200 is gradually contaminated. In order to check a contamination level of the filter 200, the user looks into the transparent member 411, 431, 441, 451, or 461, opens the door 422 to look into the filter 200 through the external mirror 421, or checks the display panel 471. Here, one selected from the external grill 101, the illumination lamp 314, and the lighting hole 315 brightly illuminates the filter 200. Also, an image of the filter 200 is reflected from the main mirror 301 and then directly transmitted to the user or is transmitted to the user through the external mirror 421 or the internal mirror 302. Therefore, the user may check the contamination level of the filter 200 through the transmitted image of the filter 200.

Here, if the contamination level of the filter 200 reaches a threshold value, the filter 200 is replaced. However, if the contamination level of the filter 200 does not reach the threshold value, the air cleaning device 1 is continuously used.

According to one or more embodiments as described above, a contamination of a filter may be checked from an outside without separating the filter from an air cleaning device. Therefore, the air cleaning device eases an inconvenience of a user who checks the contamination of the filter and enables the user to accurately check a replacement time of the filter.

Also, the contamination of the filter may be checked without separating the filter from the air cleaning device. Therefore, a recontamination of surrounding air may be prevented from occurring due to the separation of the filter.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. An air cleaning device comprising:
    a main body;
    a filter configured to be disposed in the main body to purify air; and
    an image transmitter configured to show a state of the filter to an outside of the main body,
    wherein the image transmitter is a main mirror;
    wherein the main mirror is disposed to incline toward a side of the filter so as to reflect a part of the filter;
    wherein the main body comprises:
        a check hole that is formed in a position into which an image reflected from the main mirror is projected for visual inspection,
        an external mirror configured to be disposed to incline toward the check hole, and
        a door that opens and closes the check hole; and
    wherein the external mirror is attached onto the door.

2. The air cleaning device of claim 1, wherein a transparent member is installed in the check hole.

3. The air cleaning device of claim 1, wherein the main body comprises an internal blocking plate configured to block parts except the check hole that is exposed when the door is opened.

4. The air cleaning device of claim 1, wherein the check hole is formed on one selected from a side, a front surface, and an upper surface.

5. An air cleaning device comprising:
    a main body;
    a filter configured to be disposed in the main body to purify air;
    an image transmitter configured to show a state of the filter to an outside of the main body, wherein the image transmitter is a main mirror; and
    an internal mirror configured to incline toward the main mirror or to be disposed parallel with the main mirror so as to re-reflect the image reflected from the main mirror for visual inspection,
    wherein the main mirror inclines toward a side of the filter to reflect a part of the filter, and the main body further comprises:
        a check hole that is formed in a position into which the image reflected from the internal mirror is projected,
        an external mirror configured to be disposed to incline toward the check hole, and
        a door that opens and closes the check hole; and
    wherein the external mirror is attached onto the door.

6. The air cleaning device of claim 5, wherein a transparent member is installed in the check hole.

7. The air cleaning device of claim 5, wherein the check hole is formed on a front surface of the main body.

8. The air cleaning device of claim 1, wherein the main mirror is rotatably installed to change the reflected part of the filter.

9. The air cleaning device of claim 1, further comprising:
    an illumination lamp configured to be disposed in the main body to illuminate the part of the filter reflected from the main mirror.

10. The air cleaning device of claim 1, wherein the main body comprises a lighting hole that is formed in a position of the main body from which light outside of the main body is irradiated onto the part of the filter reflected from the main mirror.

11. An air cleaning device comprising:
    a main body;
    a filter configured to be disposed in the main body to purify air;
    a check hole configured to penetrate the main body so as to show an internal part of the main body for visual inspection;
    a door that opens and closes the check hole,
    a main mirror configured to reflect a part of the filter; and
    an external mirror configured to be disposed outside the main body to re-reflect an image of the part of the filter reflected from the main mirror or an internal mirror configured to be disposed inside the main body to re-reflect the image of the part of the filter reflected from the main mirror,
    wherein the external mirror is attached onto the door.

12. The air cleaning device of claim 11, wherein the main mirror rotates to adjust an angle.

13. The air cleaning device of claim 12, wherein the rotation of the main mirror is manually controlled by a handle or automatically controlled by an electric motor in order to rotate the main mirror to enable a user to view different areas of the filter.

14. The air cleaning device of claim 8, wherein the rotation of the main mirror is manually controlled by a handle or automatically controlled by an electric motor in order to rotate the main mirror to enable a user to view different areas of the filter.

* * * * *